Patented Mar. 12, 1940

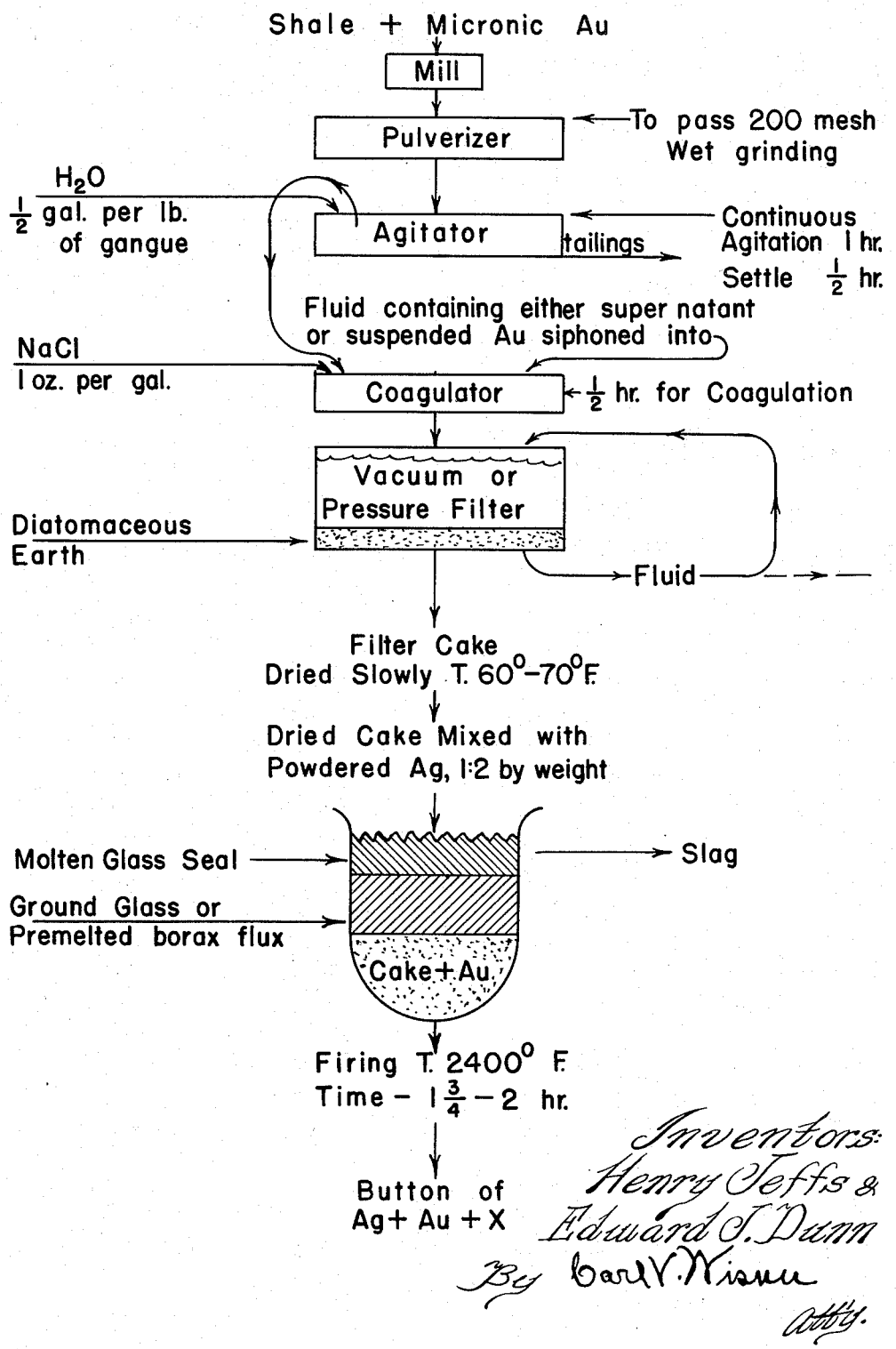

2,193,234

UNITED STATES PATENT OFFICE 2,193,234

PROCESS IN RECOVERING MICRONIC PARTICLES OF GOLD AND THE LIKE FROM ROCK AND ORE

Henry Jeffs, Berwyn, and Edward J. Dunn, Chicago, Ill., assignors to Micronic Gold Recoveries, Inc., a corporation of Illinois Application November 3, 1938, Serial No. 238,646

12 Claims. (Cl. 75—83)

This invention concerns itself with a process for extracting gold, platinum, silver and the like, when found in the form of minute particles permeating sedimentary or argillaceous rock, such as shale or solidified rock flour, for example. Generally speaking, the metallic particles, to the recovery of which our invention is directed, have a diameter of approximately one micron or less.

Gold and other values have been found in rock of the nature described, and may generally be said to be found in micronic form in many types of rock, both sedimentary and igneous. So far as we are aware, no methods except the herein-described process can successfully extract such micronic metallic particles on a commercial basis. The object of this invention, then, is to provide a simple, cheap and efficacious process whereby such particles can be commercially extracted.

The steps involved in the herein-described process are diagrammatically set forth in the flow sheet of the attached drawing. They comprise substantially the following steps in the order stated: comminuting or pulverizing the shale or other rock in which the micronic particles are found, then washing the same with a suitable amount of water and agitating the pulverized material in the washing process, after which the mixture of water and pulverized material is permitted to settle for a time interval, then removing the liquid by siphoning or decantation to another receptacle, adding a coagulator to coagulate the micronic particles, filtering the liquid through a filter, the filtration means being preferably of diatomaceous earth, slowly drying the cake, and firing the filter cake in a crucible after it has been mixed with a carrier or collector of powdered silver, topped by a layer of ground glass or fused borax as a flux, and sealed in a manner hereinafter to be described. The result, in the bottom of the crucible, will be a button of silver, gold and whatever other values, more or less, are to be found in the ore. It is thus to be seen that the steps involved are the following: (1) Pulverization; (2) Agitation; (3) Siphoning or decantation; (4) Coagulation; (5) Filtration; (6) Preparing the filter cake for firing; (7) Firing.

The foregoing steps will be hereinafter described in the order of their practice, for brevity, reference being had only to the extraction of gold, although the term "gold" as hereinafter used, is to be understood to include silver, platinum, and whatever other values may be present.

1. *Pulverization.*—The shale or other rock containing micronic particles of gold is first broken in a mill to a convenient size and then pulverized or comminuted in a tubular pulverizer to the degree that the resulting material will pass a 200-mesh screen. Any of the commonly known commercial tube mills will be adequate. It is to be understood, of course, that the degree of pulverization must necessarily carry some latitude, in view of the variants of the auriferous values to be found in the rock. For example, it has been found that pulverization to the degree that the material will pass a 200-mesh screen is efficacious with certain types of rock; finer pulverization will produce added values from the same rock, but not perhaps in direct proportion to the added cost involved. The degree of pulverization is one which can readily be determined by a person skilled in the art, given the factor of the values which are sought to be recovered. We prefer to use wet pulverization or comminution, care being taken, of course, to retain all of the fluid used in this stage of the process, and to pass all of the comminuted gangue and fluid to the next stage.

2. *Agitation.*—When the gangue has been sufficiently pulverized, it is then placed in an agitator and water is added thereto. In practice, we have found that the addition of one-half gallon of water per pound of gangue is sufficient, although no critical proportions can be stated. In the preferred method, the temperature of the added water should be less than the atmospheric temperature. The material is then continuously agitated for a time interval of one hour, after which it is permitted to settle for a period not to exceed one-half hour. During the period of settling, the fluid will usually retain a muddy color, as a result of slime held in suspension, but the principal proportion of the gangue will settle to the bottom. The values will be found either to be supernatant or held in suspension in the fluid.

3. *Siphoning or decantation.*—When the time interval for settling has expired, the resulting liquid, carrying with it gold particles either supernatant or in suspension, is removed from the receptacle by a siphon, pump or other suitable means, or by decantation, care being taken not to agitate the gangue at the bottom of the receptacle, as unnecessary addition of gangue will tend to render further steps in the process less efficacious, since the values sought to be recovered have for the most part been separated from the gangue during the agitation stage.

4. *Coagulation.*—The next step calls for the addition of means to coagulate the gold in the fluid which has been siphoned from the gangue. Various coagulants, such as vinegar or sulphuric acid, are known and can be used, but we prefer to use common salt (sodium chloride) in the proportion of about one ounce of salt, avoirdupois, per gallon of fluid. In practice, the time interval for coagulation has been maintained at one-half hour.

5. *Filtration*.—After the time interval for coagulation has expired, the fluid is placed in a filter, various known commercial vacuum or pressure filters being adequate for the purpose. The filter is lined with a layer of diatomaceous earth as the filtration material. The amount of diatomaceous earth used per gallon of fluid to be filtered may vary, and can adequately be determined by a person skilled in the art of filtration. During the process of filtration it will be found that a substantial proportion of the values carried supernatant or suspended in the fluid will be captured by the filter and retained in its cake, the fluid passing off through the filter minus these values. It is good practice, however, to refilter the fluid one or more times.

It is to be understood, of course, that other filter materials may be used, animal membrane being one example. Chamois has been found adequate, but its original cost and the fact that it must be incinerated before firing, are considerations which give diatomaceous earth the preference. It is to be understood that when a filter such as chamois is used, it is incinerated, and the ash, carrying the metallic particles sought to be recovered, is treated in the same manner in preparation for firing as the cake of the diatomaceous earth filter.

6. *Preparing the filter cake for firing*.—The cake may be removed from the filter, either piecemeal or in toto, by known methods, and it is then prepared for firing in a crucible. After filtration the cake should first be carefully and slowly dried, the drying temperature being preferably sixty to seventy degrees Fahrenheit. The cake is then thoroughly mixed with powdered silver in the proportions of two parts of silver to one part of cake by weight. The silver should be powdered as finely as can conveniently be done, but it has been found that if it is fine enough to pass a 200-mesh screen, it will adequately serve the purposes of the herein-described process. After the cake and the silver have been thoroughly mixed and intermingled, the product is placed in a crucible or smelting furnace. The mixture is then tamped down as compactly as possible to exclude as much air as practicable therefrom. The purpose of excluding air arises from the fact that when the crucible is fired, the heat of firing will cause the air to rise and bubble through the hereafter-described seal. Other gases may likewise be generated in the firing process and will likewise bubble through the seal. The values, being micronic in character, are very light, and some may be lost through being carried away by escaping gases. Elimination of all possible sources of this difficulty, then, will add to the efficacy of the process.

Over the top of the mixture is placed a layer of ground glass or pre-melted borax as a flux, after which the mass is again tamped, and over the top of said flux is then poured a layer of molten glass to serve as a seal for the crucible. The proportions of cake and flux should be approximately equal, as shown somewhat diagrammatically in the attached drawing; the depth of the molten glass seal should be as great as the dimensions of the crucible and the amount of cake and flux deposited therein will permit, care being taken, however, to leave a margin between the level of the molten glass and the top of the crucible to prevent the glass from boiling over.

7. *Firing*.—The crucible is then fired for a period of from one and one-half to two hours at a temperature of from 1760 degrees Fahrenheit (the melting point of silver) up to any temperature to which the crucible may be practically subjected. If any carrier or collector or flux is used having a higher melting point than silver, the minimum firing temperature must be above such melting point. In practice, we have found that the maintenance of a temperature of 2400 degrees Fahrenheit for a time interval of from one and three-quarters to two hours adequately fulfills the requirements of the process.

It has further been found that litharge may be substituted for the powdered silver in performing the process, although the results in the use thereof do not prove as consistent as when powdered silver is used. When litharge is used, cupellation is necessary, and it has been found that many of the gold particles are driven off during the cupellation process. Other equivalents for the collector or carrier and the fluxes will readily occur to persons skilled in the art. Examples which might be enumerated are copper, cadmium, antimony or tin, or any metal which readily alloys with gold. At the completion of the firing, a button of silver, gold and such other values as the ore may contain, will be found in the bottom of the crucible.

It is to be understood that the hereinbefore-described process constitutes the preferred method for obtaining the results described, but that in part it may be departed from through the use of known equivalents without completely impairing the efficacy thereof.

It is further to be understood that the word "micron" as used herein is not necessarily used in its precise sense of one millionth of a metre, but is hereby defined as any metallic particle having minute dimensions, having the quality of being held supernatant or suspended in a fluid, but not being colloidal in nature.

Having fully described our invention, we claim:

1. The process of recovering substantially micronic particles of gold or the like, from rock or ore, comprising pulverization, washing the gangue with a fluid and agitating the mixture, siphoning or decanting the fluid from the gangue, subjecting the siphoned fluid to a coagulant, filtering the fluid, intermingling the cake resulting from filtration with a carrier or collector, and firing the mixture of cake, carrier and a flux in a crucible having a seal of molten glass or the like covering said charge and flux, the firing temperature being sufficient to melt the carrier and flux.

2. The process of recovering substantially micronic particles of gold or the like, from rock or ore, comprising pulverization, washing the pulverized gangue with a fluid, agitating the mixture, siphoning or decanting the fluid from the gangue, subjecting the siphoned fluid to a coagulant, filtering the fluid, intermingling the cake resulting from filtration with a carrier or collector, and firing the same in a crucible having a layer of a flux on top of said mixture, and a seal over said layer of flux, said firing being at a temperature sufficient to melt said carrier and flux.

3. The process of recovering substantially micronic particles of gold, silver or platinum from rock or ore, comprising pulverization, washing the gangue with a fluid and agitating the mixture, siphoning or decanting the fluid from the gangue, subjecting the siphoned fluid ti a coagulant, filtering the fluid, intermingling the cake resulting from filtration with a carrier or collector, and firing the mixture of cake, carrier and a flux in a crucible having a seal of molten glass or the like covering said charge and flux, the firing temperature being sufficient to melt the carrier and flux.

4. The process of recovering substantially micronic particles of gold or the like, from rock or ore after the same has been comminuted, washed and agitated, comprising the siphoning or decantation of the washing fluid from the comminuted gangue, filtering the same, intermingling the cake resulting from filtration with a carrier or a collector, and firing the same with a flux in a crucible having a seal of molten glass or the like covering said charge and flux.

5. The process of recovering substantially micronic particles of gold or the like, from rock or ore, after the same has been finely comminuted, comprising washing and agitating the gangue in approximately one-half gallon of water per pound of gangue, settling the mixture, siphoning or decanting the fluid with supernatant or suspended particles from the gangue, adding a coagulant, filtering the fluid through diatomaceous earth, drying the cake, mixing the dried cake with finely powdered silver in the proportion of approximately two parts of silver to one of cake by weight, and firing the cake and silver in a crucible with a layer of flux and a seal covering said layer of flux.

6. The process of recovering substantially micronic particles of gold or the like, from rock or ore, after the same has been finely comminuted, comprising washing and agitating the gangue in approximately one-half gallon of water per pound of gangue, settling the mixture, siphoning or decanting the fluid with supernatant or suspended particles from the gangue, filtering the fluid through diatomaceous earth, drying the cake, mixing the dried cake with finely powdered silver in the proportion of approximately two parts of silver to one of cake by weight, and firing the cake and silver in a crucible with a layer of flux and a seal covering said layer of flux.

7. In the art of recovering substantially micronic particles of gold or the like, from rock or ore, that step which consists in intermingling a cake of diatomaceous earth containing filtered metallic particles with powdered silver before firing.

8. In the art of recovering substantially micronic particles of gold or the like, from rock or ore, that step which consists in firing a thoroughly mixed charge of filter material, micronic metallic particles and finely powdered silver with a flux in a crucible having a seal of molten glass or the like covering said charge and flux.

9. In the art of recovering substantially micronic particles of gold or the like, from rock or ore, that step which consists in intermingling a cake of diatomaceous earth containing filtered metallic particles with powdered silver before firing, in the proportion of approximately two parts of silver by weight to one of cake.

10. In the art of recovering substantially micronic particles of gold or the like from rock or ore, that step which consists in intermingling a cake of diatomaceous earth containing filtered metallic particles with a carrier before firing.

11. In the art of recovering substantially micronic particles of gold and the like from rock and ore, that step which consists in firing a thoroughly mixed charge of filtered material, micronic metallic particles and a finely powdered carrier with a flux in a crucible having a seal of molten glass or the like covering said charge and flux.

12. In the art of recovering substantially micronic particles of gold and the like from rock or ore, that step which consists in intermingling a cake of diatomaceous earth containing filtered metallic particles with a finely powdered carrier before firing, in the proportion of approximately two parts of carrier by weight to one of cake.

HENRY JEFFS.
EDWARD J. DUNN.